(12) United States Patent
Togashi et al.

(10) Patent No.: US 10,346,688 B2
(45) Date of Patent: Jul. 9, 2019

(54) CONGESTION-STATE-MONITORING SYSTEM

(71) Applicant: HITACHI KOKUSAI ELECTRIC INC., Tokyo (JP)

(72) Inventors: Junichi Togashi, Kodaira (JP); Atsushi Sassa, Kodaira (JP); Takashi Yoshida, Kodaira (JP); Yohei Akimoto, Kodaira (JP); Kazunari Iwanaga, Kodaira (JP); Tomomi Takada, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/068,293

(22) PCT Filed: Jan. 12, 2016

(86) PCT No.: PCT/JP2016/050610
§ 371 (c)(1),
(2) Date: Jul. 5, 2018

(87) PCT Pub. No.: WO2017/122258
PCT Pub. Date: Jul. 20, 2017

(65) Prior Publication Data
US 2019/0012547 A1 Jan. 10, 2019

(51) Int. Cl.
*G06K 9/00* (2006.01)
*H04N 7/18* (2006.01)
*G06K 9/46* (2006.01)

(52) U.S. Cl.
CPC ..... *G06K 9/00778* (2013.01); *G06K 9/00228* (2013.01); *G06K 9/00255* (2013.01);
(Continued)

(58) Field of Classification Search
CPC ........... G06K 9/00778; G06K 9/00771; G06K 9/00335; G06K 9/00624; G06K 9/00718; G06K 9/00255; G06K 9/00671
(Continued)

(56) References Cited

U.S. PATENT DOCUMENTS

2009/0134968 A1* 5/2009 Girgensohn ..... G08B 13/19613
340/3.1
2009/0217315 A1* 8/2009 Malik ................ G06K 9/00362
725/9
(Continued)

FOREIGN PATENT DOCUMENTS

JP 2004-272756 A 9/2004
JP 2004-529356 A 9/2004
(Continued)

OTHER PUBLICATIONS

"New Congestion Estimation System Based on Crowd Behavior Analysis Technology", NEC Technical Journal, vol. 67, No. 1 [online], [searched on Oct. 21, 2015] Internet, discussed in specification.
(Continued)

*Primary Examiner* — Ali Bayat
(74) *Attorney, Agent, or Firm* — McDermott Will & Emery LLP

(57) ABSTRACT

The present invention provides a system for visualizing the congestion degree of an entire facility using a monitoring camera. The system detects a crowd from a monitoring camera video and derives the magnitude (number of people) of the crowd from the edge amount thereof, and thereby estimates a congestion state in a range of camera video. The system also calculates a human flow (amount of movement of people) on the basis of a number of passing people counter and the magnitude and movement speed of the crowd, etc., and estimates the number of people in an area other than the range of camera video on the basis of a
(Continued)

modeled crowd behavior pattern. The model is constructed by selecting a distribution function and a parameter thereof by a statistical model selection technique such as a Bayesian Information Criteria (BIC). The congestion state is plotted on a map, allowing the congestion state of an area of interest to be grasped at once.

6 Claims, 9 Drawing Sheets

(52) U.S. Cl.
CPC ..... *G06K 9/00295* (2013.01); *G06K 9/00671* (2013.01); *H04N 7/18* (2013.01); *G06K 9/4633* (2013.01)

(58) Field of Classification Search
USPC .......................................................... 382/103
See application file for complete search history.

(56) References Cited

U.S. PATENT DOCUMENTS

| | | |
|---|---|---|
| 2013/0050502 A1 | 2/2013 | Saito et al. |
| 2013/0195364 A1 | 8/2013 | Yokomitsu et al. |
| 2014/0219503 A1 | 8/2014 | Watanabe et al. |
| 2014/0270370 A1 | 9/2014 | Saito et al. |
| 2014/0299775 A1* | 10/2014 | Kimmel ............. G06K 9/00771 250/341.8 |
| 2015/0146006 A1 | 5/2015 | Kawano |
| 2015/0381946 A1* | 12/2015 | Renkis ............. G08B 13/19656 348/47 |
| 2017/0148178 A1* | 5/2017 | Oami ...................... G06T 7/292 |
| 2017/0188199 A1* | 6/2017 | Ashley, Jr. ........... G06Q 10/063 |
| 2017/0193309 A1* | 7/2017 | Kanda ................ G06K 9/00771 |
| 2018/0247135 A1* | 8/2018 | Oami ........................ G06T 7/20 |

FOREIGN PATENT DOCUMENTS

| | | |
|---|---|---|
| JP | 2005-215909 A | 8/2005 |
| JP | 2007-243342 A | 9/2007 |
| JP | 2009-110054 A | 5/2009 |
| JP | 2009-134688 A | 6/2009 |
| JP | 2010-033195 A | 2/2010 |
| JP | 4512482 B2 | 7/2010 |
| JP | 2010-277547 A | 12/2010 |
| JP | 2012-059224 A | 3/2012 |
| JP | 2012-203669 A | 10/2012 |
| JP | 2013-116676 A | 6/2013 |
| JP | 5248236 B2 | 7/2013 |
| JP | 2014-106879 A | 6/2014 |
| JP | 5520203 B2 | 6/2014 |
| JP | 2014-182480 A | 9/2014 |
| JP | 5597781 B1 | 10/2014 |
| JP | 5613815 B1 | 10/2014 |
| JP | 2015-032133 A | 2/2015 |
| JP | 2015-508544 A | 3/2015 |
| JP | 2015-103104 A | 6/2015 |
| WO | 2013/057904 A1 | 4/2013 |
| WO | 2014/156733 A1 | 10/2014 |
| WO | 2015/119044 A1 | 8/2015 |
| WO | 2016/002408 A1 | 1/2016 |

OTHER PUBLICATIONS

International Search Report issued in Application N. PCT/JP2016/050610 dated Mar. 29, 2016, with English translation.
International Search Report issued in corresponding International Application No. PCT/JP2016/050610, dated Dec. 19, 2017, with English Translation.
"New Congestion Estimation System Based on Crowd Behavior Analysis Technology", NEC Technical Journal, vol. 67, No. 1 [online], [searched on Oct. 21, 2015] Internet, discussed in specification. (previously cited/provided).
International Search Report dated Mar. 29, 2016 in corresponding International Application No. PCT/JP2016/050610, including English Translation (4 pages).
International Preliminary Report on Patentability dated Dec. 19, 2017 in corresponding International Application No. PCT/JP2016/050610, including English Translation (11 pages).

* cited by examiner

CONGESTION-STATE-MONITORING SYSTEM

RELATED APPLICATIONS

This application is a national stage of International Application No. PCT/JP2016/050610, filed Jan. 12, 2016, the disclosure of which is incorporated in its entirety by reference herein.

TECHNICAL FIELD

The present invention relates to a monitoring system for understanding a congestion state and the like based on images captured by cameras.

BACKGROUND ART

It is generally difficult to accurately understand which areas are actually crowded and how crowded these areas are in facilities where people come and go or crowded facilities, including airports, station yards, shopping malls, and event venues. Conventional monitoring camera systems only display parts of images captured by a large number of monitoring cameras installed at facilities on displays in monitoring rooms. Consequently, it is difficult to quickly or objectively estimate the number of people with human eyes.

In recent years, VCA (Video Content Analysis) techniques have been intensively studied. The VCA techniques analyze images captured by monitoring cameras or the like using computers to automatically fetch information that has not been utilized before, and utilize the information. A technique of calculating the density of people (a congestion level) is known as a type of VCA (for example, see PATENT LITERATURES 1 to 7 and NON PATENT LITERATURE 1).

PATENT LITERATURE 1 discloses a stay condition analyzing apparatus that measures the stay frequency of a moving object in a target area, generates a heat map visualizing the distribution state of the stay frequency, and displays the heat map on a display device. The stay condition analyzing apparatus includes a positional information sorter that sorts positional information of a moving object obtained from a moving object detector based on whether the possibility that the positional information may include an error caused by partial missing of a traffic line of the moving object is high or low, a traffic-line missing position detector that detects the missing position of a traffic line based on at least two types of positional information sorted by the positional information sorter, a corrected distribution information generator that generates corrected distribution information including corrected stay frequency of the moving object based on a detection result of the traffic-line missing position detector, and a heat map generator that generates the heat map based on the corrected distribution information generated by the corrected distribution information generator.

In addition, a technique of verifying a person using two types of feature values is knowns as a technique relating to the present embodiment (for example, see PATENT LITERATURES 8 and 9).

Moreover, a technique relating to measurement, estimation, or prediction of people flows is also known (for example, see PATENT LITERATURES 10 to 12).

CITATION LIST

Patent Literature

PATENT LITERATURE 1: JP-B-5597781
PATENT LITERATURE 2: JP-B-5613815
PATENT LITERATURE 3: JP-A-2015-508544
PATENT LITERATURE 4: JP-A-2009-134688
PATENT LITERATURE 5: JP-A-2005-215909
PATENT LITERATURE 6: JP-A-2004-529356
PATENT LITERATURE 7: JP-A-2014-106879
PATENT LITERATURE 8: JP-A-2012-203669
PATENT LITERATURE 9: JP-B-5248236
PATENT LITERATURE 10: JP-B-5520203
PATENT LITERATURE 11: JP-B-4512482
PATENT LITERATURE 12: JP-A-2013-116676
PATENT LITERATURE 13: JP-A-2015-32133
PATENT LITERATURE 14: WO2015/119044
PATENT LITERATURE 15: WO2014/156733

Non Patent Literature

NON PATENT LITERATURE 1: "New Congestion Estimation System Based On Crowd Behavior Analysis Technology", NEC Technical Journal/Vol. 67, No. 1, [online], [searched on 21 Oct. 2015], Internet <URL:http://jpn.nec-.com/techrep/journal/g14/n01/pdf/140117.pdf>

SUMMARY OF INVENTION

Technical Problem

If conventional monitoring systems employ congestion estimation using VCA, only a congestion state in a field of view of each camera is understood.

The present invention has been achieved in view of the above problem, and an object of the invention is to provide a congestion-state-monitoring system that can perform congestion estimation based on VCA without any restrictions on a field of view of a camera.

Solution to Problem

A congestion-state-monitoring system according to an aspect of the present invention detects a crowd from images from monitoring cameras installed at a facility and derives the size of the crowd (the number of people) from the edge amount, thus estimating a congestion state in the range of camera images. In addition, the people flow (the movement amount of people) is calculated based on a counter for counting the number of passing people, and the size and movement speed of the crowd, and thus the number of people in an area out of the range of camera images is estimated based on modeled crowd behavior patterns. The people flow may also be calculated based on a change over time in the size of the crowd on camera images. The area out of the range of camera images may be relatively freely set, although depending on the structure of buildings. For example, the congestion state may be estimated in each floor. A model is constructed by selecting a distribution function and its parameters using well-known statistic model selection methods including AIC (Akaike Information Criteria) and BIC (Bayesian Information Criteria).

As the congestion state is plotted on the map, the congestion state in the area can be quickly understood.

Advantageous Effects of Invention

The present invention allows for congestion estimation without any restrictions on a field of view of a camera.

DESCRIPTION OF EMBODIMENTS

Figure 1:
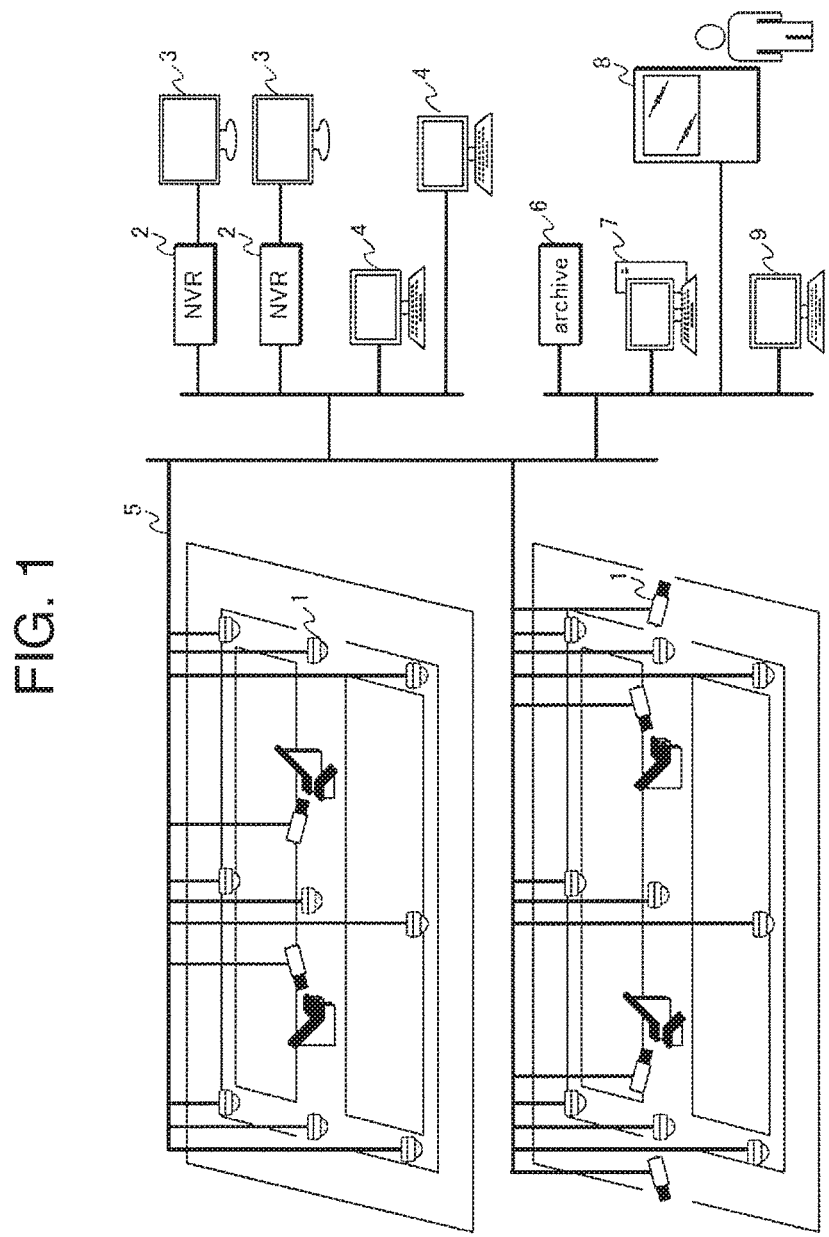
FIG. 1 is a hardware configuration diagram of a congestion-state-monitoring system.

An embodiment of the present invention is described below with reference to the drawings. In the description of the drawings, the constituent elements having substantially the same functions are denoted by the same reference numerals, and descriptions thereof are omitted.

First Embodiment

FIG. 1 shows a configuration of a congestion-state-monitoring system according to a first embodiment.

A group of cameras 1 includes a plurality of monitoring cameras installed at a commercial facility or the like, which is a monitoring target. The cameras are installed at locations where the cameras can capture points people always pass through when moving one area to another, desirably without any blind spots. The present embodiment assumes monitoring in a shopping mail. As the cameras capture entrances and exits of the shopping mall, and further entrances and exits of escalators, elevators, stairs, and the like, it is possible to understand the number of people flowing in or out of floors.

Meanwhile, a monitoring room includes one or a plurality of digital video recorders (DVRs) 2, display devices 3 attached to the DVRs 2, and one or a plurality of operation personal computers (PCs) 4 for implementing and managing functions of a general monitoring system. In addition, a LAN 5 communicably connecting the group of cameras 1 to the DVRs 2 and the operation PCs 4 is provided.

The DVR 2 obtains images with required quality from the group of cameras 1, displays the images on the display device 3, and records the images in the DVR 2. The DVR 2 usually includes a special processor adapted to image codec processing and has a capability of simultaneously decoding or transcoding a large number of channels. The number of the DVRs 2 depends on the scale of the monitoring system (the number of cameras and the number of recording channels).

The operation PC 4 has software for a video management system (VMS), which is a platform centrally managing the implementation and operation of the monitoring system, installed therein. The operation PC 4 provides a recording and playback function, alarm notification, access management, a simple image analysis function, and the like. When operated by a monitoring person, the PC 4 performs setting in the corresponding device or gives commands to the corresponding device to achieve the operation. The VMS software may be operated by the DVR 2 and the operation PC 4 may simply be a client.

An archive server 6 obtains images from the group of cameras 1, converts the images into images with quality suitable for detecting a congestion state, temporarily stores the converted images therein, and provides the converted images to an analysis server 7 or the VMS. The camera that is to obtain images is at least a camera that captures the entrances and exits of escalators described above and the like. Techniques of super-resolution, tone correction (dynamic range correction), adaptive noise reduction, and the like can be applied to image conversion.

The analysis server 7 first performs subtraction object detection, Hough transform (curve detection), feature value detection, optical flow detection, and the like on images obtained from the archive server 6. Next, as a second step, the results of the first step are used to perform object tracking (traffic line detection), face detection, and in-view congestion level estimation. As a third step, the results of the second step are used to count the number of people and to perform object classification, face feature value calculation, and spatial congestion level estimation. These processes are described in more detail. In the spatial congestion level estimation in the present embodiment, a congestion level is calculated at least per floor. The analysis results of the second and subsequent steps are returned to the archive server 6 and recorded therein as analysis logs or meta data. VMS is directly notified of important events. For example, an in-view congestion level estimation value is recorded in the archive server 6 in a common format together with the ID of a camera that has captured an image including the detected in-view congestion level estimation value, a detection time, and the like, and can be referred to from VMS. Two types of face feature values having different number of dimensions are calculated. A low-dimensional feature value is registered in a similarity search DB placed in the analysis server 7. A high-dimensional feature value is registered in a dictionary DB using the feature value registered in the similarity search DB as a key.

The analysis server 7 also includes a Web server function to generate raw data of the analysis results described above or visual display data (Web pages) using a floor map and to provide such data to professionals, facility managers, and general customers. The analysis results may also be used for higher level data mining (analysis and prediction of people's behavior). The analysis server 7 may be configured by the same hardware as the archive server 6. A part of the functions of the analysis server 7 may be achieved by other devices. In practice, when Internet access is provided, it is desirable to separately provide the Web server function in DMZ (DeMilitarized Zone) or the like.

One or a plurality of digital signage terminals 8 are provided in a commercial facility or the like to display data reflecting a congestion state, which is obtained from the Web server in the analysis server 7.

An operation PC 9 is used for managing an operation of the analysis server 7 and receiving VMS extended functions that cannot be achieved by the operation PC 4.

In the congestion-state-monitoring system according to the present embodiment, the configuration relating to the analysis of a congestion level, that is, the configuration from the archive server 6 to the operation PC 9 may be constructed as a subsystem to be an add-on in the existing main system. The system configuration is not limited to this case, and two systems may be integrally configured or the subsystem may include independently operating VMS.

Figure 2:
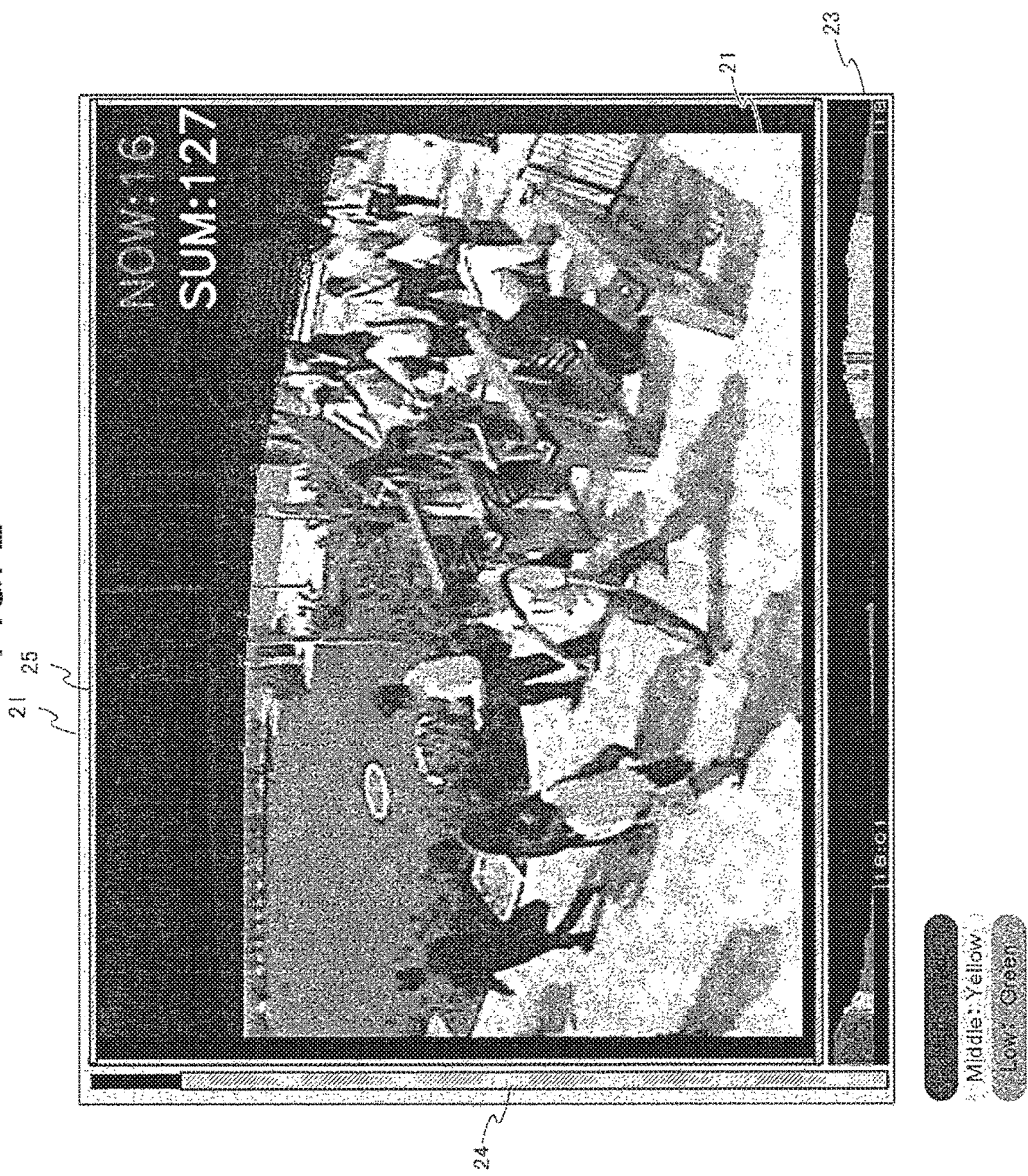
FIG. 2 shows a simple display example of a congestion state based on an in-view congestion level of a camera image.

FIG. 2 shows a simple display example of a congestion state using a camera image. Live images from a plurality of cameras are commonly tiled and displayed on a normal VMS screen. The example of FIG. 2 shows one tile. A rectangular image region 22 is provided in the tile, and a live image or a recorded image from a camera is displayed in the image region 22. An instantaneous value (an in-view congestion level) and an added sum of the number of people estimated in the field of view of the image displayed in the image region 22 are displayed in numerals at the upper right portion of the image region 22.

A history display region 23 is provided under the image region 22, and includes instantaneous values of the number of people during a fixed period of time from the past to the present, which are displayed as a graph. That is, the graph, in which the vertical axis represents the number of people and the horizontal axis represents the time, shows the time shift of the number of people. Different numbers of people at the respective times can be displayed in different colors. For example, a small number of people can be displayed in green or blue, a large number of people can be displayed in red, and an intermediate number of people can be displayed in yellow.

When there are sections in which the number of people in the past cannot be used because an image cannot be obtained from a camera or because the camera is a PTZ camera and captured an image in the past at an angle of view different from that at the present, such a state is displayed or the number of people estimated from a floor congestion level by a method to be described later (for example, covariance is multiplied as account) is used instead.

A level display region 24 is provided on the right side of the image region 22, and displays a bar (a rectangle) changing its height and color depending on the instantaneous value of the number of people.

A frame (a bordering) 25 is formed around the image displayed in the image region 22 in colors depending on the instantaneous value of the number of people, like the history display region 23.

The colors of the bar and the frame 25 in the level display region 24 correspond to the colors in the graph display region 23. If a large number of images are tiled, it is possible to quickly and roughly understand the congestion level by the color in the level display region 24.

Figure 3:
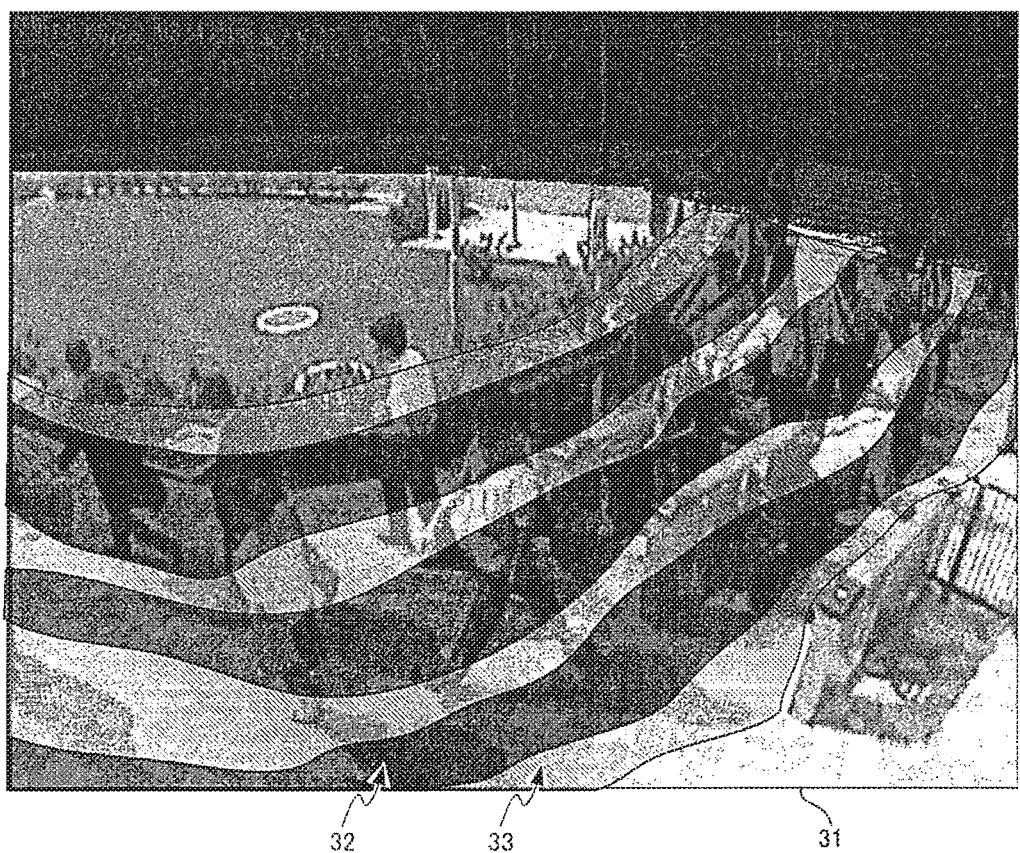
FIG. 3 shows yet another display example of a congestion state based on the in-view congestion level.

FIG. 3 shows another display example of a congestion state using a camera image. In this example, at least one image region 31 is provided on a display screen of the operation PC 9 or the like. A live image or a recorded image from a camera is displayed in a grayscale in the image region 31. A heat map image (a pseudo color image of a congestion level) including different colors depending on the time during which an object (a person) stays or the number of times that a traffic line of an object passes during a fixed period of time in the past is displayed in the image region 31 to be superimposed on (added to) a camera image. The traffic line of an object is assumed to have a finite thickness. The stay time and the number of times of passing may be determined for each pixel. FIG. 3 shows an example of displaying a passing frequency in two steps. The frequency is the highest in a region 32 and is the second highest in the region 31. Uncolored portions other than these regions hardly have a history of passing.

Figure 4:
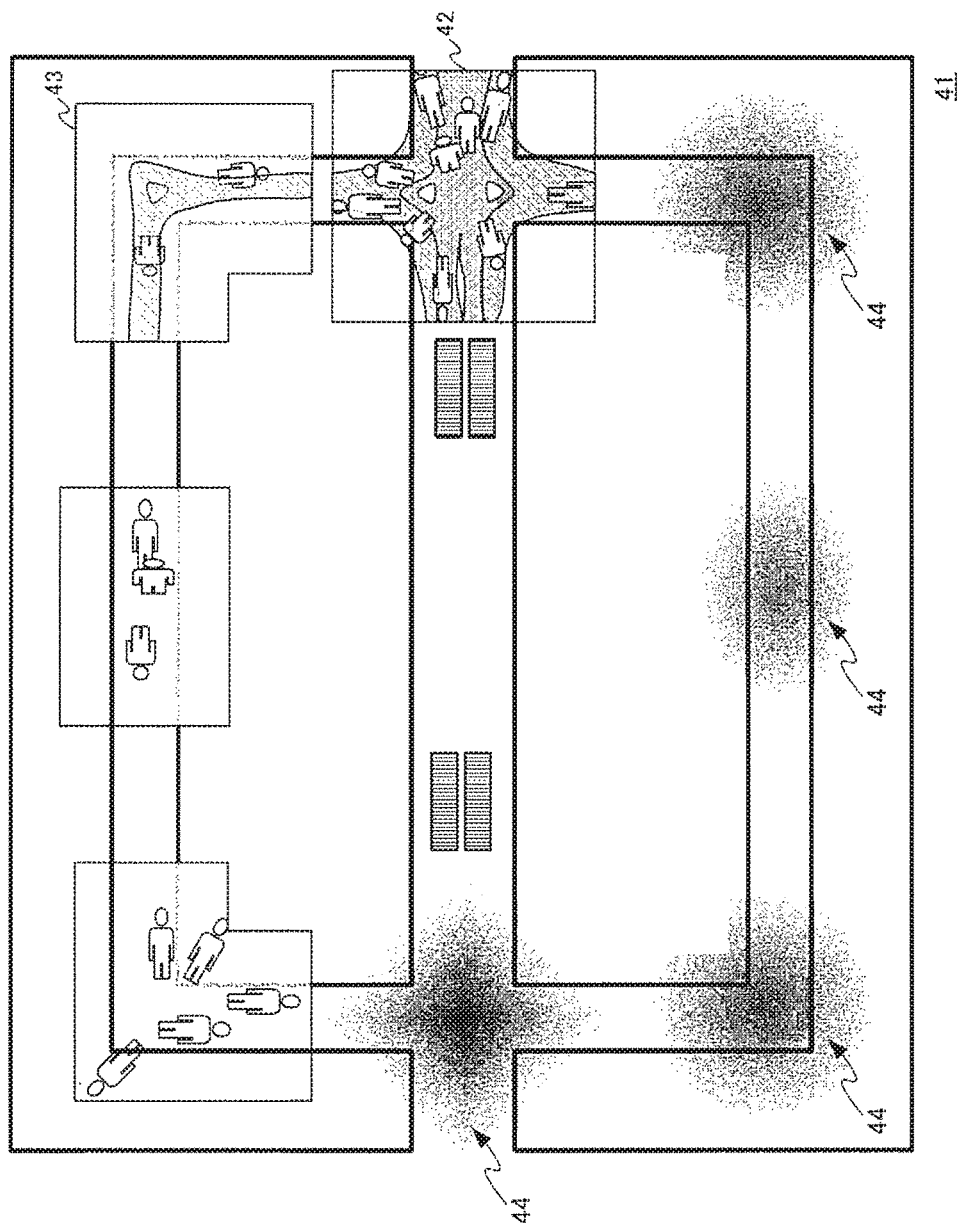
FIG. 4 shows yet another display example of a congestion state based on the in-view congestion level.

FIG. 4 shows yet another display example of a congestion state using a camera image. In this example, a floor map display region is provided on a display screen of the operation PC 9 or the like. A floor map 41 of a commercial facility (which may be a bird's-eye view as viewed from an oblique direction) that is recorded in advance is drawn in the floor map display region. Images 42 and 43 obtained by performing viewpoint conversion on the heat map shown in FIG. 3 are displayed in the floor map 41. The images 42 and 43 are simulated so as to correspond to capture ranges. The images 42 and 43 having undergone viewpoint conversion may include only a heat map without any camera image. As the images 42 and 43 are distorted by viewpoint conversion, portions of the images 42 and 43 of this example other than the range in which a congestion level needs to be detected are cut off. For example, the images 42 and 43 may be cropped to match the shape of passages.

Instead of the image having undergone viewpoint conversion, a FIG. 44 may be displayed, in which a capture range (a congestion level estimation range) is colored in the color according to the instantaneous value of the number of people used in the display example of FIG. 2. In this example, the FIG. 44 is colored in a manner that the center is the darkest and surrounding portions are successively lighter as being away from the center. An overlapping portion of edges of a plurality of the FIG. 44 includes colors additively combined, that is, is displayed dark. While FIG. 4 shows various ways of displaying a congestion level in one floor map 41 for the purpose of illustration, in practice, it is preferable to unify the way of displaying a congestion level.

As the congestion level at each camera location is displayed in the display of FIG. 4 while keeping the actual spatial position relationship, a monitoring person who looks at the display can analogize congestion levels at other locations relatively easily.

Figure 5:
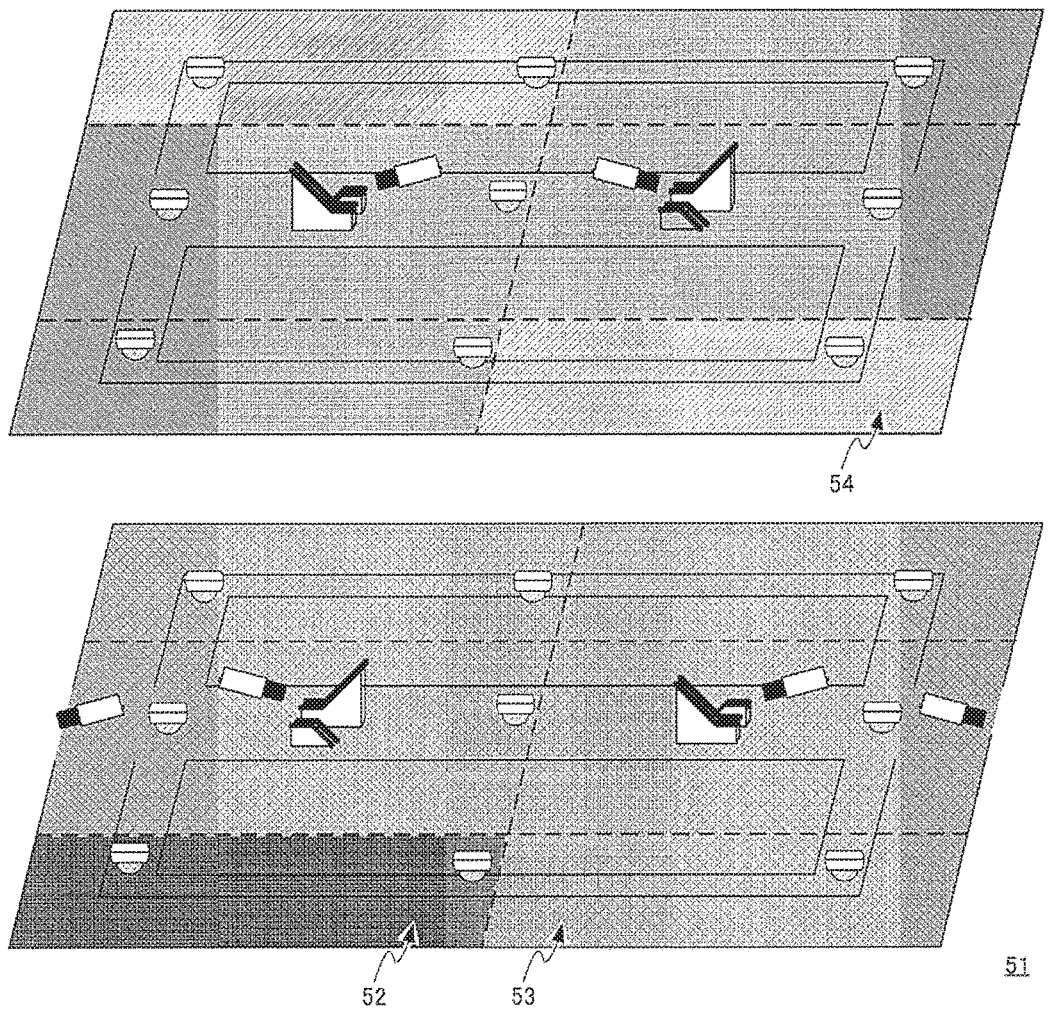
FIG. 5 shows a display example of a congestion state based on a spatial congestion level.

FIG. 5 shows yet another display example of a congestion state using a camera image of the floor. While the examples of FIGS. 2 to 4 described above use the congestion level (the in-view congestion level) in each image range, in this example, the number of people flows entering and exiting a certain area is counted and then the number of people (the spatial congestion level) in that area is estimated.

A floor map display region 51 is provided on a display screen of the operation PC 9 or the like. A floor map (a floor plan) of a commercial facility that is recorded in advance is drawn in the floor map display region 51. The floor map is displayed in a manner that each area is colored in a color related to the number of people estimated. Colors based on the population density obtained by dividing the number of people by the area of an area are commonly used. This may be achieved by preparing, for each area, a bitmap image representing pixels belonging to that area, applying colors to the bitmap image, and successively adding the bitmap image to the floor map.

FIG. 5 exemplifies a case where each floor is divided into six areas. The number of people in each floor is calculated by counting people flows at entrances and exits, and escalators. In an area without entrances and exits, the number of people flows in passages leading to that area is counted using dome camera images, and then the number of people is calculated. In an area where the number of people flows cannot be accurately counted, the number of people estimated is calculated based on the number of people in a floor and the number of people in an area where counting is possible.

Basically, it is desirable to provide the boundary of an area at a point where the number of people flows is easily counted (that is, at a camera capturing point). However, the area where the number of people is counted does not necessarily match the area where the population density is displayed, and these areas may be slightly shifted from each other. Assuming that people are equally distributed in each area, in an encroached area A, the population density does not change whereas in an expanding area B, the number of people in an encroached portion is added to the number of people in the area B and the resultant number of people is divided by the area of the area B, so that the population density is obtained.

The displays of FIGS. 2 to 5 described above may be carried out in combinations. By predicting the movement of a crowd or the movement of persons in each camera image to estimate the congestion level out of field of view of a camera, it is possible to estimate the congestion level in an area where camera images cannot be obtained or in each floor.

Distribution of information through a WEB server enables customers to understand a congestion state using, for example, smartphones even at remote locations.

It is thus possible to quickly understand which area is congested in real time. In a food court in a shopping mall, for example, shopping customers can avoid the busy time to reduce the wait time in advance, thus making good use of time and enjoying shopping.

Meanwhile, the congestion level of a tenant can be used to estimate the popularity or unpopularity of that tenant based on day of the week or time of the day. The congestion level can thus be used to prompt a mall management side to change a tenant or a floor layout.

Figure 6:
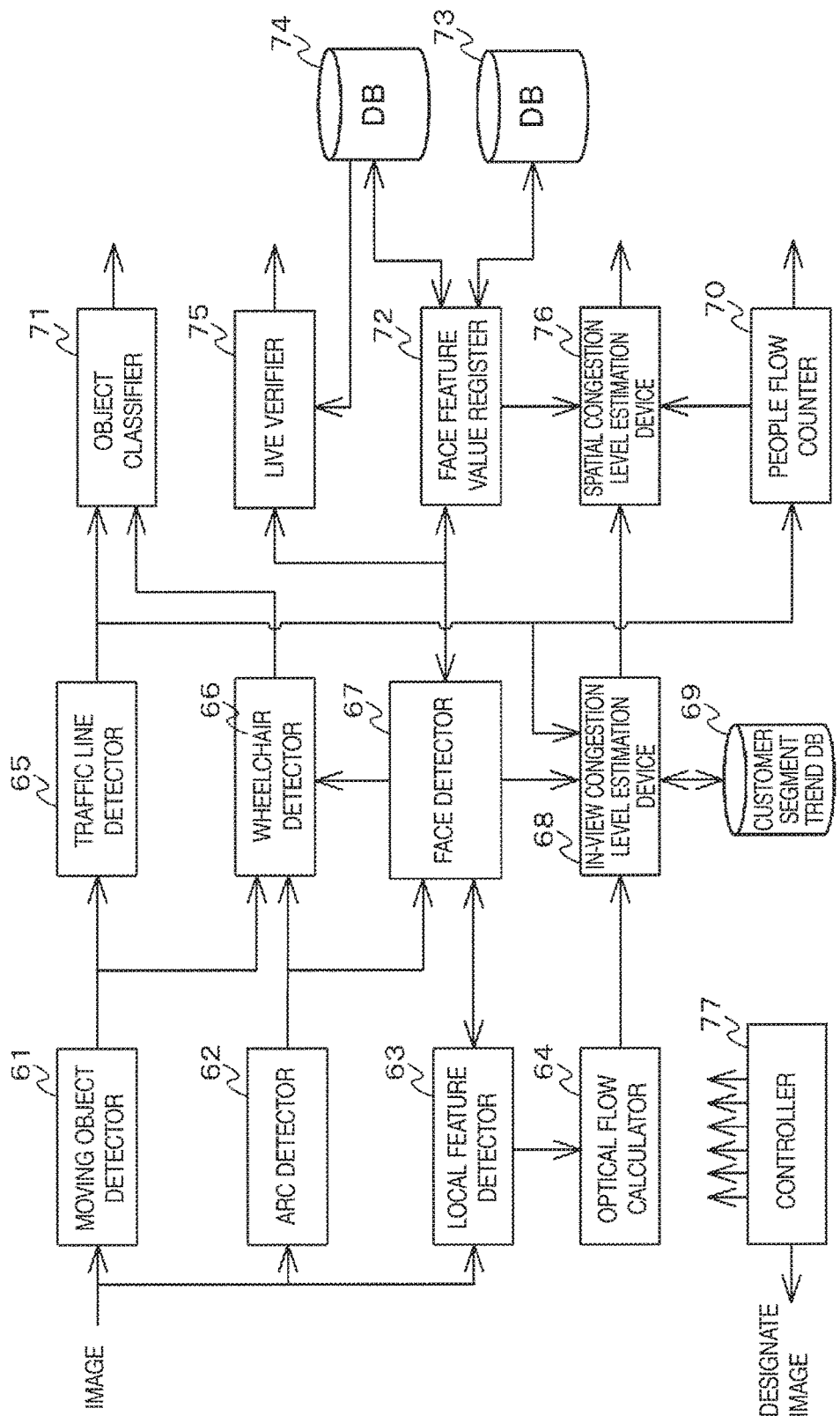
FIG. 6 is a functional block diagram of an analysis server 7.

FIG. 6 is a functional block diagram of the analysis server 7. When obtaining an image, which is an analysis target, from the archive server 6 or the like, the analysis server 7 transmits the image to a moving object detector 61, an arc detector 62, and a local feature detector 63. The transmitted image has already undergone required processes including the contrast correction described above and the like for the purpose of reducing influences of changes in capture environment such as illuminance.

The moving object detector 61 detects a region including motions in an image using background subtraction or the like. The region may be output as a bitmap or information about the position and size of the region (moving object region information).

The arc detector 62 extracts a contour using, for example, an edge filter on a pixel basis, performs three-dimensional Hough transform on the coordinate of the contour, votes the transformed coordinate, and detects an arc corresponding to a bin having obtained a large number of votes. In addition to Hough transform, it is possible to use a method in which, like an edgelet feature, interest points are combined or thinned in view of the spatial relationships between the points for the purpose of obtaining pieces of an arc and these pieces are fitted in an equation of an ellipse using a least squares method. As the arc detector 62 is used mainly for the purpose of detecting wheels of a wheel chair in the present embodiment, it is only required that voting is performed within the assumed size of such wheels. In addition, voting for lines may also be performed.

The local feature detector 63 detects an interest point using edge detection or Harris corner detection and farther calculates a local feature value such as HOG (Histograms of Oriented Gradients) on a pixel basis or a pixel block basis. Local feature values are roughly classified into local feature values that are taken out of the surrounding portion of non-uniform interest points and local feature value that are (uniformly) taken out using points on a lattice as a reference (dense sampling). At the present time, new feature values have been proposed constantly and the local feature detector 63 in the present embodiment may also use these feature values. Examples of such feature values known include local binary pattern (LBP), Haar wavelet, Gabor wavelet, texton feature, color histogram, Extended HOG, HOF (Histograms of Change Point), image moment (covariance matrix), EOH (Edge of Orientation Histograms), Edgelet, Shapelet, Harris-affine, Hessian-Atfine, SURF (Speeded Up Robust Features), Principal Curvature-Based Region, IBR (intensity-extrema-based Regions), MSER (Maximally Stable Extremal Regions), FAST (Features from Accelerated Segment Test), KAZE, GLOH, and binary feature value (BRIEF, BRISK, ORB, FREAK, CARD, and BinBoost). In response to a request from a face detector 67, the local feature detector 63 calculates a local feature value at a designated position and of a designated type, and transmits a designated partial image itself.

An optical flow calculator 64 tracks an interest point output from the local feature detector 63 across frames to calculate an optical flow. In this case, the optical flow calculator 64 may subject the original image to a KLT (Kanade-Lucas-Tomasi) Tracker or a Gunnar Farneback method. To obtain a Densesampling feature value, one feature value to be tracked or having been tracked (for example, a median) may be selected for every predetermined grid. An optical flow-based feature value (HOF (Histograms of Optical Flow), MBH (Motion Boundary Histogram), or the like) may be further calculated using the calculated optical flow. The optical flow calculator 64 is optional.

Well-known techniques can be utilized for the configurations from the moving object detector 61 to the optical flow calculator 64, and these configurations can be performed robustly at a relatively less computation amount or at a fixed computation amount or less. If the computation amount is desired to be reduced, for example, processes may be performed by limiting the process target to the region where motions have been detected by the moving object detector 61 and its neighbor or by thinning process frames.

A traffic line detector 65 tracks the position of a region including motions in an image across frames to obtain the movement trajectory of that position. In the present embodiment, the movement trajectory is mainly used for the purpose of estimating an in-view congestion level, and thus the precision of individual tracking is not so important. While FIG. 6 shows an example of tracking based on the moving object region information from the moving object detector 61, tracking may be performed by a method of searching for a maximum correlation position across frames (active search by Murase or the like) using a dense sampling-based feature value obtained from the local feature detector 63 or the like, such as HOG, HOF, and HCP, or a method of using Dense Optical Flow obtained by the optical flow calculator 64 (Dense Trajectory). Drift trajectories are removed from the trajectories obtained and only significant trajectories are preferably output.

A wheelchair detector 66 basically calculates the probability that the arc detected by the arc detector 62 is a wheel of a wheelchair based on the size and positional relationship of the arc, and outputs the arc together with information about the estimated position and size of the wheelchair. For example, the wheelchair detector 66 may use the method described in PATENT LITERATURE 13. In this case, the result of face detection near the wheelchair (whether a face is detected and the position and size of a face) may be used for the calculation of the probability.

The face detector 67 detects a face at any location in an image based on the feature value detected by the local feature detector 63. General face detection uses a Haar-like (Joint Haar-like) feature and searches for a partial image in which the feature resembles a face most. A discriminator represented as a linear combination of individual Haar-like features is optimized by learning such as Adaboost. The local feature detector 63 has a capability of calculating the feature value required for the face detector 67. With Real AdaBoost that uses the determination result of the current discriminator, which is a continuous value (probability), for feedback as it is to achieve learning, or by combining components of a histogram-based feature value and defining a bin that determines the values of the components at the same time, it is possible to obtain a feature value reflecting co-occurrence.

When the face detector 67 detects a partial image with predetermined or more face likeliness, the face detector 67 outputs the partial image itself, the position and size of the partial image, the probability that the partial image is a face, a low-dimensional feature value corresponding to the partial image, and positional relationship information (a face direction or the like) of face parts that is easily obtained from the Haar-like feature or the like. The low-dimensional feature value is obtained with relatively small calculation cost and useful for discriminating a person if the person's face does not face the front. The low-dimensional feature value is calculated by the local feature detector 63. The low-dimensional feature value may originally include the positional relationship information as a part thereof, or may reuse the Haar-like feature. The low-dimensional feature value desirably includes a feature value different from a feature value strongly affected by the positional relationships between organs of the face, like front face recognition. In the present embodiment, the low-dimensional feature value is not an interest point-based feature value but a dense sampling-based feature value like HOG. In commercially available face detection engines, there are those that can obtain information including estimation values of the gender, age, and expression (feeling) and the color of skin. Such information may be used for the low-dimensional feature.

Figure 8:
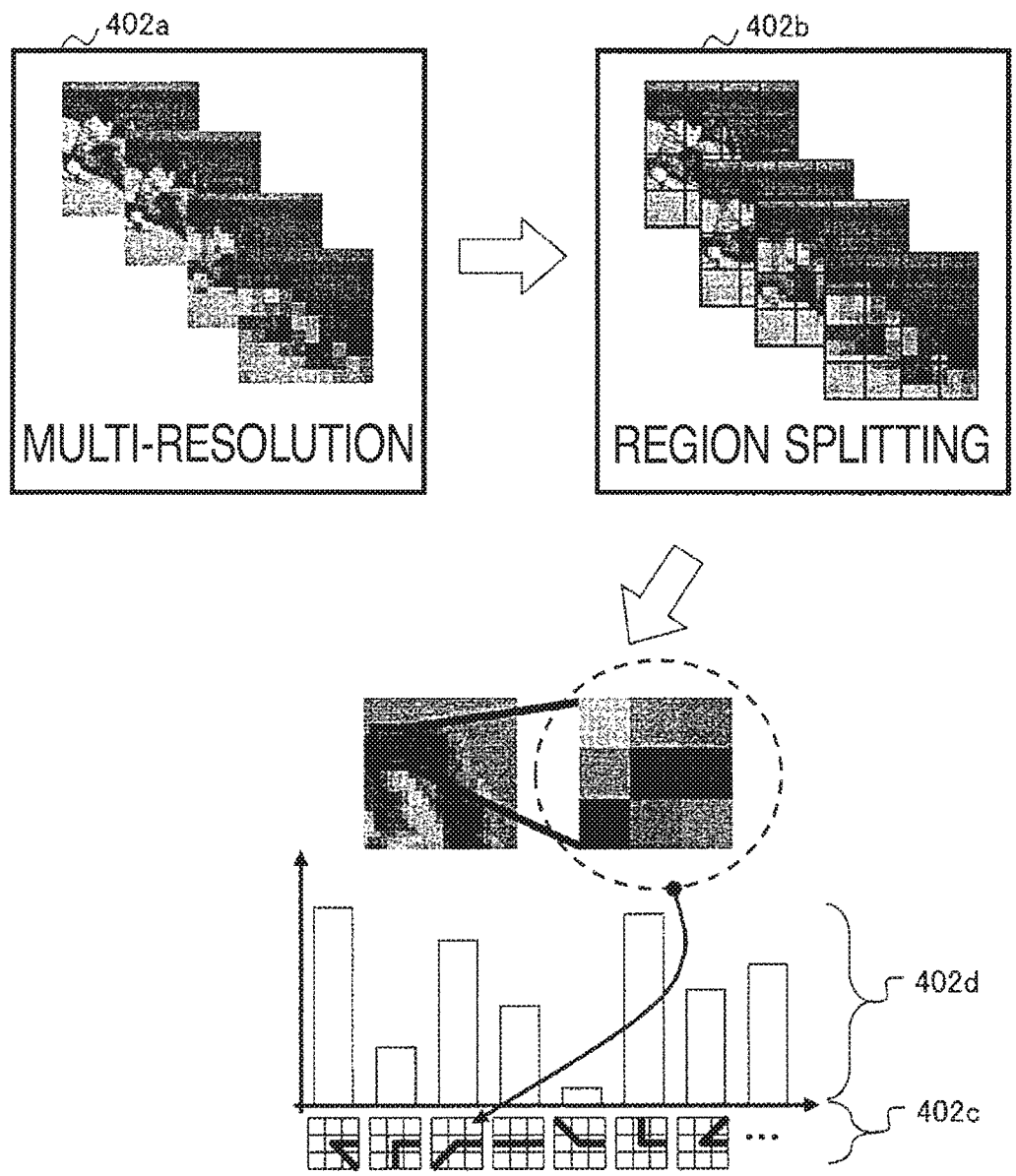
FIG. 8 is a schematic diagram showing an example of a method of calculating a low-dimensional feature value.

FIG. 8 schematically shows an example of a method of calculating a low-dimensional feature value in the present embodiment. This calculation method first performs multi-resolution processing on an input image. For example, Gaussian blur and pixel thinning are alternately applied to the input image (in the present embodiment, the face image from the face detector 202) a plurality of times, so that a low-resolution image group 402a, which is also referred to as a Gaussian pyramid, is obtained. Such a process is performed for preventing a feature value from being affected by the resolution of the input image. As the face image is obtained by cutting out an area of the face captured with any size, the face image is enlarged or reduced to a predetermined size before the multi-resolution.

Next, region splitting is performed on the image group 402a, so that an image group 402b is obtained. The split regions are common in images with different resolutions.

Next, the split regions are farther split into small blocks in the size of three pixels by three pixels, the edge patterns of the pixel values of the small blocks are found, and the number of edge patterns that appear is counted. A few tens of predetermined patterns 402c are prepared for the edge patterns, and the number of times of matches of the edge patterns with the small blocks is a frequency 402d. Several thousand dimensional vectors including the elements of all the frequencies 402d of all the small blocks of the image group 402b thus calculated are the origin of the feature value. The origin feature value is multiplied by a predetermined matrix (desirably a sparse matrix (a band matrix)) to provide lower dimensional vectors, which are used for a feature value. The matrix is prepared in advance using sufficient samples by a scheme such as PCA (Principal Component Analysis).

Returning to FIG. 6, when receiving a request from a face feature value register 72, for example, the face detector 67 obtains a high-dimensional face feature value enabling discrimination of an individual with high precision from partial images having undergone face detection, and transmits the high-dimensional face feature value to the face feature value register 72. For example, face authentication is known in which an interest point or the position of a face organ is reproduced on a three-dimensional face model. Alternatively, it is permissible to use a feature in which a spatial position from which a feature value is obtained is not stored correctly (that is, a feature of a two-dimensional stationary image). In addition, feature values based on low-level features other than Haar-like used for low-dimensional features and feature values even including co-occurrence features with less frequency can be used. While a higher dimension may allow for more redundant data, the property of being more resistant to missing data is sometimes useful for nearest neighbor search in which data is kept secret.

The high-dimensional face feature value may be calculated in the face detector 67 or in the local feature detector 63. Calculation loads of the face detector 67 and the local feature detector 63 change depending on the number of feature points or faces in images. Under high load, a mode of prioritizing detection of more faces (for example, all the faces in images) and a mode of prioritizing calculation of a low-dimensional feature value (for example, a mode of calculating the low-dimensional feature value every time when a face is detected) are appropriately switched and operated. In the detection prioritizing mode, in addition to information about the number of faces detected in images in a frame, information about the number of partial images finally determined not to include faces but including portions closely resembling faces.

An in-view congestion level estimation device 68 estimates the congestion level in the capture range of a camera. The in-view congestion level estimation device 68 estimates the congestion level using the number of interest points such as corners and edges in images and motions thereof. While an edge flow is added (an absolute value is added) in the present embodiment, it is possible to use the method of simply adding an edge amount (intensity), which is described in PATENT LITERATURE 14, for the purpose of estimating a stationary crowd group.

Figure 7:
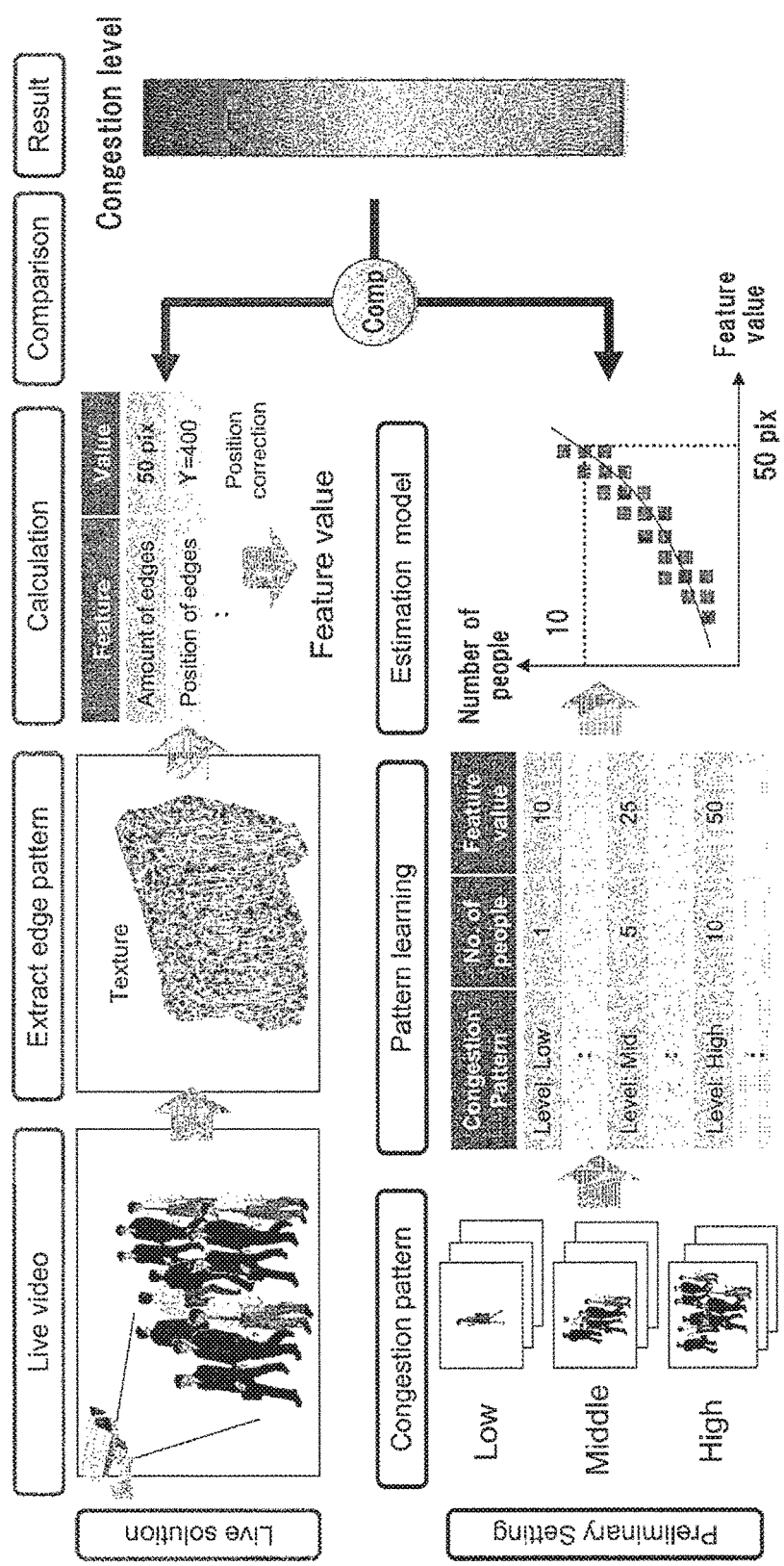
FIG. 7 is a schematic diagram showing an operation of an in-view congestion level estimation device 68.

FIG. 7 is a schematic diagram showing an operation of the in-view congestion level estimation device 68 in the present embodiment. As described in PATENT LITERATURE 14, depth (subject distance) corrections are performed and then a feature value reflecting such depth corrections is obtained. That is, an edge amount calculated for every horizontal line in an image is multiplied by a weight coefficient based on a height Y of the horizontal line from a lower end of the image and the resultant values are added, so that the feature value is obtained. The weight coefficient is uniquely determined based on camera installation parameters (homograph)/matrixes). In general, it is possible to obtain a feature value with less variation (error) by summing up the edge amounts, as compared to counting the number of edges.

The relationship between the feature value and the number of people estimated can be represented by broken line approximation. Segment regression calculates or updates a regression expression for each broken line. For example, the face detector 67 is periodically operated in the detection prioritizing mode. In the detection prioritizing mode, the number of faces in one frame is stored as a true value together with a feature value for that true value. When a predetermined amount of samples are collected for any segment, regression calculation is performed. In addition, multiple regression analysis (multivariate analysis) may be performed using the average age, gender, and skin color of the faces. For example, if more edges tend to be obtained from women than men because of clothes and hairstyles, the number of people might be estimated to be larger than the actual number of people in a case of a high proportion of women. The multiple regression can estimate the number of people reflecting such a problem.

The in-view congestion level estimation device 68 may calculate another congestion level based on a movement trajectory obtained from the traffic line detector 65. For example, every time when a movement trajectory is obtained, the in-view congestion level estimation device 68 additively draws the movement trajectory as a line having a predetermined width in a single frame, thus obtaining the stored trajectory image shown in FIG. 3. In the stored trajectory image, locations where many people pass are shown dark.

The in-view congestion level estimation device 68 can also count the number of people flows. That is, the in-view congestion level estimation device 68 adds edge flows only in a travel direction of an escalator using images capturing customers on the escalator as a source. As the speed of the escalator is fixed, the number of customers is periodically sampled and thus the number of people passing the escalator can be estimated.

A customer segment trend database (DB) 69 stores the number of faces, gender, age, and the like that are obtained from the face detector 67 in the detection prioritizing mode, makes such information correspond to a calendar (a day of the week), a time slot, a stay time, and the like, and mechanically learns these trends. When receiving a request from the in-view congestion level estimation device 68 or the like, the customer segment trend database 69 provides the learned trend.

A people flow counter 70 counts the number of times that the movement trajectory from the traffic line detector 65 crosses a determination line set in an image. Images from cameras capturing an entrance and exit to a certain area (a section) are intended to be used for people flow counting. If a plurality of entrances and exits are present for each area, cameras desirably capture all the entrances and exits. As the density of people is higher (as person images are overlapped), errors are larger. The determination line is set in each camera capturing images so as to correspond to, for example, an entrance or exit of an escalator. As one moving object is counted a plurality of times depending on its size or an escalator with a width of one person is captured from its side, errors due to overlapping images can be almost removed unless an extremely crowded situation. In particular, when an image captured from directly above is obtained, it is possible to configure the moving object detector 61, the traffic line detector 65, and the people flow counter 70 using the technique described in PATENT LITERATURE 15.

An object classifier 71 determines whether a wheelchair appears in an image based on the movement trajectory from the traffic line detector 65 and the output from the wheelchair detector 66. The output of the wheelchair detector 66 is the information about the probability of each ellipse (each wheel) detected and the position and size of a wheelchair estimated from the wheel. The output is not necessarily processed in real time and includes many misdetections and leak detections. The object classifier 71 tracks the position of a wheelchair using a Kalman filter, a particle filter, mean-shift, or the like to obtain the trajectory of the wheelchair. In this case, the object classifier 71 can refer to the movement trajectory from the traffic line detector 65 that can easily perform processes in real time. For example, the movement trajectory closely corresponding to the position (and movement speed) of the wheelchair among movement trajectories in the traffic line detector 65 can be used as the movement trajectory of the wheelchair instead of a missing output of the wheelchair detector 66.

The object classifier 71 evaluates the speed stability of the trajectory of the wheelchair obtained by tracking to finally determine a pedestrian or a wheelchair. VMS is notified of the result and the position and the image of the wheelchair are displayed on the operation PC 9 or the like. When a monitoring person determines that help is needed, the monitoring person asks a security guard to help a person in a wheelchair.

Every time when a low-dimensional feature value is obtained from a face in the face detector 67, the face feature value register 72 classifies (indexes) the low-dimensional feature value, makes the low-dimensional feature value correspond to time information or a partial image, and registers the resultant low-dimensional feature value in a low-dimensional feature value DB 73. For classification, space indexing systems including R-trees, kd-trees, LSH (Locality-Sensitive Hashing), and the like are used. For the R-trees or the like, nodes are appropriately added or split surfaces are optimized. When the low-dimensional feature value is a binary feature, such processes may be easily implemented. In spacetime classification, while a low-dimensional feature value itself may include time information, a DB may be simply partitioned at fixed intervals.

When a high-dimensional feature value is also obtained with the low-dimensional feature value, the high-dimensional feature value is made to correspond to the low-dimensional feature value and registered in a high-dimensional feature value DB 74. Corresponding satisfies at least a unidirectional link that enables the high-dimensional feature value to be referred to from the low-dimensional feature value.

In the low-dimensional feature value, the face of the same person does not need to be classified any more, and thus a plurality of faces may be registered at leaf nodes. When the registered face has already been present at the same leaf node as a newly registered face, the face feature value register 72 evaluates the probability that the faces are the same based on the distance between feature values. When the probability is equal to or higher than a predetermined level, face verification is performed using a high-dimensional feature. When the probability is equal to or lower than the predetermined level, node splitting is appropriately performed. When face verification is performed on a leaf node for the first time, the high-dimensional feature value of the registered face is not necessarily stored in the DB 74. It is thus necessary to calculate the high-dimensional feature value from a partial image of the registered face recorded in the low-dimensional feature value DB 73. As face verification requires high load as described above, the face verification is temporarily queued and then performed with low priority, or some queues are not performed and become time-out.

When it is determined by the face verification that the faces are the same, the face feature value register 72 outputs time information of the two faces, a camera ID, a part of the components of the low-dimensional feature value to the spatial congestion level estimation device 76.

The low-dimensional feature value DB 73 stores low-dimensional feature values of faces detected by a plurality of cameras, time information (frame IDs), and sets of camera IDs in recording locations (indexes or key values) determined by space indexes of the low-dimensional feature values. The faces captured by all the cameras in the system are thus collected in one location.

The high-dimensional feature value DB 74 stores high-dimensional feature values of faces in recording locations determined by information (for example, the time information and the sets of camera IDs) that can be made to correspond to space indexes of the corresponding low-dimensional feature values or the corresponding registered low-dimensional feature values. When registering the low-dimensional feature values, the low-dimensional feature values having registration IDs applied thereto may be recorded in the low-dimensional feature value DB 73. The recording location of the high-dimensional feature value can thus be determined by the registration ID. The high-dimensional feature value DB 74 may be configured by a well-known relational DB or the like.

A live verifier 75 verifies the limited number of faces at high speed (in real time). For example, the live verifier 75 holds high-dimensional feature values of lists of known VIP customers or known suspicious persons in a memory. Every time when any high-dimensional feature value is detected by the face detector 67, the live verifier 75 performs verification in the memory using linear search. The live verifier 75 also includes lists for low-dimensional feature values and performs linear search. If there is any match (feature values are similar to each other), the live verifier 75 may instruct the face detector 67 to calculate the high-dimensional feature value.

The spatial congestion level estimation device 76 basically calculates the number of people in each floor or area (the average people density in each floor) based on the counting result of the people flow counter 70 and applies the local number of people (the people density) estimated in the in-view congestion level estimation device 68 to the number of people calculated, thus estimating the people density distribution of that floor in each floor. The simplest method is to combine the average people density with the local people density with an appropriate weight. FIG. 5 displays only the average people density, whereas FIG. 4 (the FIG. 44) displays only the local people density. An appropriate interpolation process or an appropriate spatial filtering process is performed in a manner that an unnatural boundary does not appear between a location where the local people density is obtained and a location where the local people density is not obtained. When it is impossible to rely on the counted number from the people flow counter 70, the counted number estimated by the in-view congestion level estimation device 68 may be used.

The spatial congestion level estimation device 76 can make various analyses including linear regression using a large number of samples of combinations of average people densities and local people densities, which are obtained at the substantially same time. In addition, the spatial congestion level estimation device 76 can approximate the stay time in each floor (the time required for people now entering a floor to exit that floor) or statistically estimate the stay time. For example, it is possible to use the difference in time between the point of time in the past when the added number of people flowing in was the same as the current added number of people flowing out and the present time as an approximated value of the stay time. The spatial congestion level calculated by the spatial congestion level estimation device 76 is a general term including the people density, the stay time, and the like, and is output to the archive server 6 or the like and recorded in time series for easy readout.

Characteristics of people are observed not by a simple, distribution but by a mixture of a plurality of distributions, that is, can be classified into a plurality of categories (clusters). A fixed effects model (least squares dummy variable estimation), a generalized linear mixed model, a hierarchical. Bayesian model in panel data analysis, and the like can be applied to the classification. For example, it is assumed that the stay time in each floor has a normal distribution according to combinations of the gender, age, purchase preference (stay time), and the like. If a data combination of the flow-in time and the flow-out time of the same person having undergone face verification is randomly sampled and further the gender, age, and the like are obtained, parameters of the normal distribution are easily calculated in a customer segment trend DB 69 and can be used for, for example, initial values of hyperparameters in the hierarchical Bayesian model. The hyperparameters are then modified by Markov chain Monte Carlo methods, variational Bayesian methods, or the like.

As each person performs explicit state transition like Markov chain at a location where the movement between adjacent floors using an escalator or the like is dominant, it is assumed that there is a relevance between the congestion levels of the floors. This can be learned by initially estimating shift random variables based on data of face verification indicating the movement between floors and then using the count result of the people flow counter 70.

A controller 77 determines the source of an image to be obtained (a camera) to make a request to the archive server 6 or the like. In addition, the controller 77 sets inputs and outputs of the configurations of the moving object detector 61 to the spatial congestion level estimation device 76 and the priority of processes thereof. Moreover, the controller 77 sets the priority of processes of each configuration (resource distribution) in each camera. The controller 77 also sets attributes of a camera (camera parameters) to be reflected in image processing in each configuration. That is, connections of the configurations shown in FIG. 6 are not fixed, and may be freely changed based on the control of the controller 77.

As an example, when it is desirable for the face detector 67 to prioritize processes of images from two cameras capturing an entrance of a commercial facility, simple prioritizing based on the order of processes may result in a case where other cameras with lower orders are not processed at all. The priority is controlled by round robin so that minimum resources are distributed to images with lower orders. Also in the archive server 6, higher priority may be applied to a camera functioning as a face detection target for the purpose of processing an image to be subjected to super-resolution.

As described above, the analysis server 7 of the present embodiment appropriately uses an image processing technique with a small processing amount to count the number of people flows substantially in real time and estimate a congestion level based on the number of people flows, thus visually displaying such results as a graph, a map, a heat map, or the like.

Privacy is protected in the analysis server 7. That is, the analysis server 7 of the present embodiment holds a face image, a face feature value, an estimated gender, and an estimated age, but does not handle information that socially identifies an individual (a name, an actual age, an affiliation, an ID card number, credit card information, and the like). In other words, the analysis server 7 discriminates (distinguishes) a person, but does not identify a person.

Meta data stored in the archive server 6 or the like is held in a manner that a behavior (movement) history of a person can be reproduced, but is not directly connected to a sales system. It is thus difficult to make the meta data correspond to an individual, Data in the customer segment trend DB 69, which is analyzed based on the gender, age, time slot of a visit, and the like, can be matched to data in the sales system using a method that does not identify an individual for use in analysis.

Figure 9:
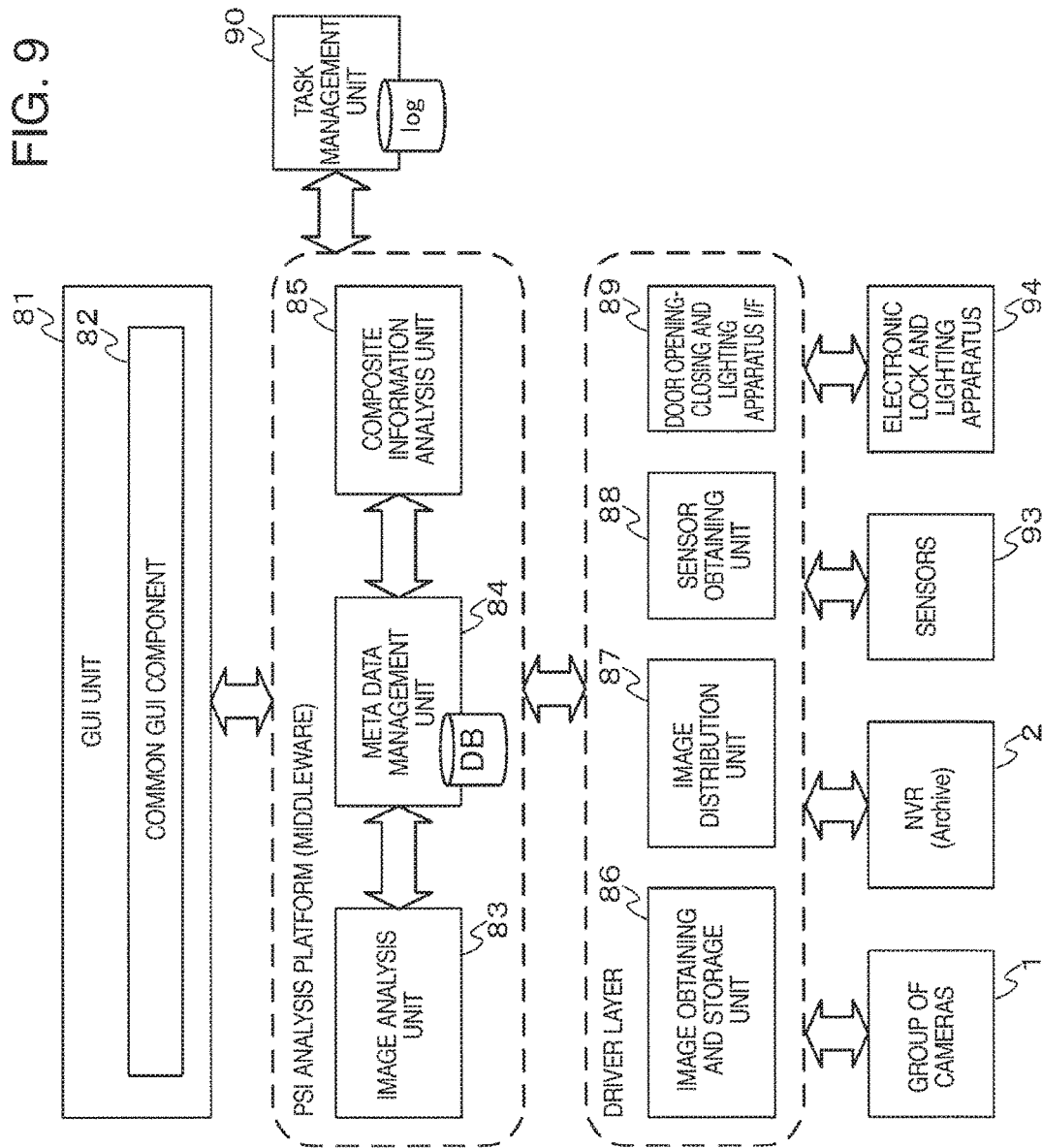
FIG. 9 is a software configuration diagram of the congestion-state-monitoring system.

FIG. 9 shows a software configuration of the congestion-state-monitoring system according to the present embodiment. The software has a hierarchical structure of an application, middleware, and a driver. Interfaces between the hierarchies are clearly determined and modules in the hierarchy use the determined interfaces.

A GUI unit 81 is a basic function of VMS that arranges applications to provide an operation screen. In the present embodiment, the GUI unit 81 performs combining of displays of congestion levels shown in FIGS. 2 to 5.

While various types of operation screens are used, GUIs used in the operation screens are commonized as common GUI components.

An image analysis unit 83 corresponds to the function of the analysis server 7 shown in FIG. 6. The customer segment trend DB 69 may belong to a composite information analysis unit 85.

A meta data unit 84 manages a large amount of data obtained from the image analysis unit 83 and a sensor 93 in an appropriate corresponding manner in a DB. The meta data management unit 84 corresponds to the archive server 6 shown in FIG. 1.

The composite information analysis unit 85 performs big data analysis. For example, the composite information analysis unit 85 analyzes or predicts behaviors of customers.

An image obtaining and storage unit 86 implements ONVIF or other protocols to cross-sectionally obtain or store images from various types of cameras and recorders.

An image distribution unit 87 two-dimensionally distributes or archives images obtained by the image obtaining and storage unit 86.

A sensor obtaining unit 88 receives signals from a card reader for entrance and exit management, a human sensor, a microphone, and other sensors 93, and manages synchronization of the signals. The sensor obtaining unit 88 may have a function of an IoT gateway based on protocols such as Wi-SUN.

A door opening-closing and lighting apparatus I/F 89 are an interface for remotely, operating an electronic lock and a lighting apparatus 94. When the protocols of the door opening-closing and lighting apparatus I/F 89 are the same as those of the sensor obtaining unit 88, such protocols can be shared with the sensor obtaining unit 88.

A task management unit 90 drives predetermined tasks by various types of events and data and logs the results. Examples of an event driven task include a task of recording images from a camera with certain image quality at a predetermined time and a task of opening or closing a door in response to a read result of a reader for entrance and exit while performing face recognition using images from a camera at that location. Examples of a data driven task include a task of giving the alarm when congestion is expected at a location as a result of data analysis and monitoring that location with higher priority and a task of performing monitoring when a suspicious behavior of an individual or an abnormal trend of a crowd is detected, while tracking the individual using face detection or predicting the future behavior of the crowd. The task management unit 90 may be arranged between the middle ware and the application or may belong to the application layer.

The congestion-state-monitoring system according to the present embodiment enables a congested location to be easily understood by visualization. It is thus possible to optimize, for example, the deployment of security guards. That is, as a state of a congestion level at each location in a facility is stored and stored data is analyzed, it is possible to plan the location or time slot that security guards are deployed more correctly or it is possible to handle a congested location with less security guards.

Understanding a congestion state is important not only in commercial facilities but also in public traffic facilities such as railways. In addition, analyzing the movement (behavior) of a person is useful for finding waste and improving productivity in factories and construction sites.

The configurations of the system and device according to the present invention are not limited to those described above, and various configurations may be used. In addition, the present invention can be provided as, for example, as a method or device that performs the process according to the present invention, a program for enabling a computer to perform such a method, and a permanent tangible medium that stores the program.

INDUSTRIAL APPLICABILITY

The present invention can be applied to a CCTV (Closed-Circuit Television) system or the like.

REFERENCE SIGNS LIST

1 group of cameras
2 network video recorder (DVR)
3 display device
4 operation personal computer (PC)
5 LAN
6 archive server
7 analysis server
8 digital signage terminal
9 operation PC
61 moving object detector
62 arc detector
63 interest point detector
64 optical flow calculator
65 traffic line detector
66 wheelchair detector
67 face detector
68 in-view congestion level estimation device
69 customer segment trend DB
70 people flow counter
70 object classifier
72 face feature value register
73 low-dimensional feature value DB
74 high-dimensional feature value DB
75 live verifier
76 spatial congestion level estimation device
77 controller

The invention claimed is:

1. A congestion-state-monitoring system for estimating a congestion level of an entire facility, the congestion-state-monitoring system comprising:
a computer programmed to:
obtain, from a plurality of cameras, images to be used for estimating a congestion level of a region of the facility, the images including a first image capturing first people entering and exiting through an entrance and an exit of the region, the entrance and the exit of the region corresponding to a first sub-region of the region;
estimate a number of the first people visible in the first image based on a sum of interest points and feature values extracted from the first image,
determine an in-view congestion level of the region based on the estimated number of first people visible in the first image, the in-view congestion level corresponding to a congestion level of the first sub-region of the region;
estimate an out-of-view congestion level of the region based on the in-view congestion level of the region, the out-of-view congestion level corresponding to a congestion level of a remaining area of the region that is invisible in the first image;
determine a spatial distribution of the congestion level of the region of the facility by combining, complementing, or analyzing the in-view congestion level and the out-of-view congestion level; and
control a graphical user interface to display a heat map of the region generated based on the spatial distribution of the congestion level of the region including both the in-view congestion level and the out-of-view congestion level, the heat map including different colors that correspond to respective congestion degrees within the congestion level of the region.

2. The congestion-state-monitoring system according to claim 1, wherein
the computer is further programmed to estimate durations of stay or a distribution of the durations of stay in the region based on a plurality of samples of combinations of 1) average people densities of the region and 2) people densities of the first sub-region, the average people densities of the region are obtained at a substantially same time as the people densities of the first sub-region, and
the out-of-view congestion level of the remaining area of the region is estimated based further on a model of a crowd behavior pattern constructed by a statistic model selection method.

3. The congestion-state-monitoring system according to claim 1, further comprising a face detector that detects one or more faces from the first image and outputs a number of the one or more faces, wherein
when estimating the number of the first people visible in the first image, 1) edges or corners are extracted from the first image as the interest points and 2) a segment regression is performed using a plurality of combinations of the sum and the numbers of the faces.

4. The congestion-state-monitoring system according to claim 3, wherein the computer is further programmed to verify the one or more faces in the first image,
wherein, based on a plurality of combinations of an entering time and an exiting time of one or more people whose faces are verified in the first image, parameters of the durations of stay or the distribution of the duration of stay are calculated for respective predetermined categories regarding characteristics of the one or more people,
wherein the calculated parameters of the duration of stay or the distribution of the duration of stay are used for a hyper-parameter in a model of the crowd behavior pattern, and wherein the graphical user interface is a digital signage terminal that displays, as the heat map to be seen by general public, a distribution of a current congestion level for the entire facility based on the congestion level of the region,
wherein when the facility comprises a plurality of regions including the region, 1) congestion levels in all the plurality of regions are estimated and 2) the distribution of the current level for the entire facility is based further on the estimated congestion levels in all the plurality of regions.

5. The congestion-state-monitoring system according to claim 4,
wherein the computer is programmed to temporarily prioritize the detecting of the one or more faces to update a regression equation used for estimating the in-view congestion level,
wherein flows of the one or more people are measured based on movements of the edges or the corners within the first image, and
wherein a reliable one of the one or more people is selected to be used in measuring the flows of the one or more people for estimating the in-view congestion level.

6. A congestion-state-monitoring method for estimating a congestion level of an entire facility, the congestion-state-monitoring method comprising:
counting or estimating a first number of first people visible in a first image based on a sum of interest points and feature values extracted from the first image, the first image capturing the first people entering and exiting through an entrance and an exit of a first region of the facility, the entrance and the exit of the first region corresponding to a sub-region of the first region;
counting or estimating a second number of second people visible in a second image based on a sum of interest points and feature values extracted from the second image, the second image capturing the second people entering and exiting through an entrance and an exit of a second region of the facility, the entrance and the exit of the second region corresponding to a sub-region of the second region;
determine a first in-view congestion level of the first region based on the first number of first people visible in the first image, the in-view congestion level corresponding to a congestion level of the first sub-region of the first region;
determine a second in-view congestion level of the second region based on the second number of second people visible in the second image, the in-view congestion level corresponding to a congestion level of the second sub-region of the second region;
estimate a first out-of-view congestion level of the first region based on the first in-view congestion level of the first region, the first out-of-view congestion level corresponding to a congestion level of a remaining area of the first region that is invisible in the first image;
estimate a second out-of-view congestion level of the second region based on the second in-view congestion level of the second region, the second out-of-view congestion level corresponding to a congestion level of a remaining area of the second region that is invisible in the second image;

determine a first spatial distribution of the congestion level of the first region of the facility by combining, complementing, or analyzing the first in-view congestion level and the first out-of-view congestion level;

determine a second spatial distribution of the congestion level of the second region of the facility by combining, complementing, or analyzing the second in-view congestion level and the second out-of-view congestion level; and control a graphical user interface to display a heat map of the entire facility generated based on the first spatial distribution of the first region and the second spatial distribution of the second region, the heat map including different colors that correspond to respective congestion degrees within the congestion level of the facility.

* * * * *